(12) United States Patent　　(10) Patent No.: US 12,665,212 B1

Perritt, Jr.　　(45) Date of Patent:　Jun. 23, 2026

(54) GRAVITATIONAL CASCADE FLOW BATTERY

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 19/419,014

(22) Filed: Dec. 14, 2025

(51) Int. Cl.
H01M 8/18 (2006.01)
H01M 8/0438 (2016.01)
H01M 50/70 (2021.01)

(52) U.S. Cl.
CPC ......... H01M 8/188 (2013.01); H01M 8/0438 (2013.01); H01M 50/70 (2021.01); *H01M 2300/0025* (2013.01); *H01M 2300/0082* (2013.01); *H01M 2300/0085* (2013.01); *H01M 2300/0091* (2013.01)

(58) Field of Classification Search
None
See application file for complete search history.

(56) References Cited

U.S. PATENT DOCUMENTS

| | | | | | |
|---|---|---|---|---|---|
| 3,933,520 | A | * | 1/1976 | Gay | H01M 4/02 |
| | | | | | 429/231.95 |
| 5,888,665 | A | * | 3/1999 | Bugga | H01M 4/8621 |
| | | | | | 429/218.2 |
| 2005/0272214 | A1 | * | 12/2005 | Chiang | H01M 10/0436 |
| | | | | | 257/273 |

(Continued)

FOREIGN PATENT DOCUMENTS

| | | | | | |
|---|---|---|---|---|---|
| CN | 107171010 | A | * | 9/2017 | .......... H01M 8/1069 |
| CN | 112094427 | A | * | 12/2020 | .............. H01M 6/34 |

(Continued)

OTHER PUBLICATIONS

Stauffer, Nancy W., Flow batteries for grid-scale energy storage, MIT News, Apr. 7, 2023, https://news.mit.edu/2023/flow-batteries-grid-scale-energy-storage-0407 (USA).

*Primary Examiner* — Dah-Wei D. Yuan
*Assistant Examiner* — Pin Jan Wang
(74) *Attorney, Agent, or Firm* — Henry H. Perritt, Jr.

(57) ABSTRACT

A gravitational cascade flow battery achieves practical energy density of 200 Wh/L through micro-encapsulated phase change materials and eliminates mechanical components using acoustically-controlled thixotropic flow. The system comprises a vertical tower where gel-state electrolyte slurries flow through cascaded reaction stages only when acoustic chokes locally liquefy the fluid through ultrasonic stimulation. Smooth micro-encapsulated spheres contain crystallizing active materials, preventing membrane and electrode abrasion while maintaining high energy density. Thixotropic behavior created by fumed silica prevents settling at rest but enables rapid flow under acoustic activation. A passive fail-safe system releases hot solvent upon power loss, gravity-flushing the cascade to prevent catastrophic solidification. The acoustic control provides precise digital flow modulation with <100 ms response time while achieving 80-82% round-trip efficiency. Applications include grid-scale energy storage, renewable energy integration, and underground installations utilizing natural or artificial vertical structures.

10 Claims, 8 Drawing Sheets

(56)         References Cited

U.S. PATENT DOCUMENTS

2011/0200848 A1 * 8/2011 Chiang .................. B60L 58/27
                                                      429/105
2014/0322612 A1 * 10/2014 Wietelmann ......... H01M 4/366
                                                      429/231.95
2015/0093606 A1 * 4/2015 Chen ................. H01M 10/4214
                                                      429/105
2018/0062214 A1 * 3/2018 Smith ............... H01M 10/4242
2021/0249677 A1 * 8/2021 Suss ...................... H01M 8/188
2025/0379204 A1 * 12/2025 Gerrish .............. H01M 4/0404

FOREIGN PATENT DOCUMENTS

EP          0107396 A1 * 5/1984 ......... H01M 8/2484
KR       20160122093 A * 10/2016 ............. H02J 13/16
WO    WO-2017178252 A1 * 10/2017 ........... H01M 8/188

* cited by examiner

REACTION CHAMBER 202

ELECTRODE 204

MEMBRANE 206

316

314

310

ELECTRODE 204

130

POLYMER SHELL 402

412

LIQUID 404 — CHARGE 414 → GEL 416

GRAVITATIONAL CASCADE FLOW BATTERY

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL

Not applicable

STATEMENT REGARDING PRIOR DISCLOSURES BY THE INVENTOR OR A JOINT INVENTOR

Not applicable

BACKGROUND

Field of the Invention

The present invention relates to electrochemical energy storage systems, and more particularly to flow battery systems employing gravity-driven circulation of thixotropic electrolyte slurries, micro-encapsulated phase change materials for enhanced energy density, and acoustic field manipulation for rheological flow control and performance optimization.

Description of Related Art

Conventional redox flow batteries store electrical energy in liquid electrolytes containing dissolved electroactive species. While offering advantages of decoupled power and energy scaling, existing flow batteries suffer from fundamental limitations that have prevented widespread adoption. Vanadium redox flow batteries (VRFBs), the most commercially mature technology, achieve energy densities of only 25-35 Wh/L due to solubility limits of vanadium species in aqueous solutions.

Current flow battery systems require extensive pumping systems to circulate electrolytes between storage tanks and reaction stacks. These pumps consume 2-5% of the stored energy as parasitic losses, require regular maintenance, and represent a significant capital cost. The pumping infrastructure includes complex manifolds, valves, and flow distribution systems that add mechanical complexity and failure points.

Ion exchange membranes in flow batteries, typically costing \$200-500/m², represent 30-40% of stack costs while being prone to fouling, crossover contamination, and mechanical degradation from pressure cycling. Attempts to eliminate membranes through laminar flow designs have resulted in unacceptable mixing and efficiency losses.

Previous attempts to increase energy density through higher concentration electrolytes encounter precipitation problems that clog flow channels and foul electrodes. When crystallization occurs in conventional flow batteries, sharp crystalline particles abrade soft electrode materials and damage expensive membranes, leading to rapid system failure. The art has generally taught away from allowing any solid formation in flow battery systems.

Flow control in battery systems typically relies on mechanical valves and pumps that are prone to wear, especially when handling corrosive electrolytes or slurries. Tesla valves and other passive flow control devices lose effectiveness at the low flow velocities (0.5-2 cm/s) typical of gravity-driven systems, functioning essentially as open pipes.

Existing flow batteries lack effective fail-safe mechanisms for power loss scenarios. When pumps stop, electrolyte can stratify, precipitate, or solidify in place, potentially destroying the entire system. Recovery from such events often requires complete disassembly and replacement of damaged components.

A flow battery system is needed that achieves high practical energy density, eliminates mechanical pumping and valving requirements, prevents membrane damage from solid particles, provides reliable flow control at low velocities, and includes fail-safe mechanisms for power loss scenarios.

BRIEF SUMMARY

The present invention provides a gravitational cascade flow battery system achieving practical energy density of 200 Wh/L through micro-encapsulated phase change materials while eliminating mechanical components through acoustically-controlled thixotropic flow in a gravity-driven architecture.

In one aspect, the invention comprises a vertical tower configuration where thixotropic electrolyte slurries flow downward through multiple cascade reaction stages under gravity, with flow controlled exclusively through acoustic chokes—constrictions where focused ultrasonic fields locally liquefy gel-state electrolyte on demand, eliminating all mechanical pumps and valves.

The system employs engineered micro-encapsulated particles containing electroactive species within permeable polymer spheres of 50-500 µm diameter that undergo reversible phase transitions between solid (gel) and liquid states during charge/discharge cycles, achieving practical energy density of 200 Wh/L while preventing electrode abrasion through smooth sphere morphology.

An acoustic transducer array provides important system functions: locally liquefying thixotropic electrolyte at choke points to enable controlled flow, preventing particle deposition through standing wave patterns, enhancing mass transport via acoustic streaming, maintaining membrane permeability through controlled cavitation, and providing precise digital flow control through power modulation.

The invention incorporates a passive gravitational fail-safe system comprising an elevated solvent reservoir with a fail-open magnetic valve that releases upon power loss, initiating gravity-driven flush of pure solvent through the entire cascade to dissolve any solidified material and prevent catastrophic system freezing.

The thixotropic electrolyte formulation includes rheology modifiers creating yield stress behavior that prevents flow at rest but enables rapid liquefaction under acoustic stimulation, providing inherent flow control without mechanical components while preventing particle settling during standby periods.

A control system employing machine learning algorithms optimizes acoustic patterns for each choke point, manages thixotropic state transitions, predicts maintenance requirements, and coordinates fail-safe activation while providing self-regulating operation through rheological feedback.

TERMS AND DEFINITIONS

Amphoteric substance: A substance that can donate protons in some situations and accept protons in others.

Electron: a negatively charged ion.

LSTM: An LSTM (Long Short-Term Memory) neural network is a specialized type of Recurrent Neural Network (RNN) designed to learn long-term dependencies in sequential data.

Proton: a positively charged ion.

Rheology modifiers: Additives that control the flow, thickness, and texture (rheology) of liquid or semi-solid products, changing how they behave under stress.

Thixotropic flow: Occurs in a fluid when viscosity decreases under stress and then increases when stress is removed. This allows fluids to become thinner and to flow more easily when agitated.

Vertical tower: The physical structure containing the "Cascade Reaction Column" as a functional component.

BRIEF DESCRIPTION OF THE SEVERAL VIEWS OF THE DRAWINGS

To identify the discussion of any particular element or act easily, the most significant digit or digits in a reference number refers to the figure number in which that element is first introduced.

DETAILED DESCRIPTION

System Overview

Figure 1:
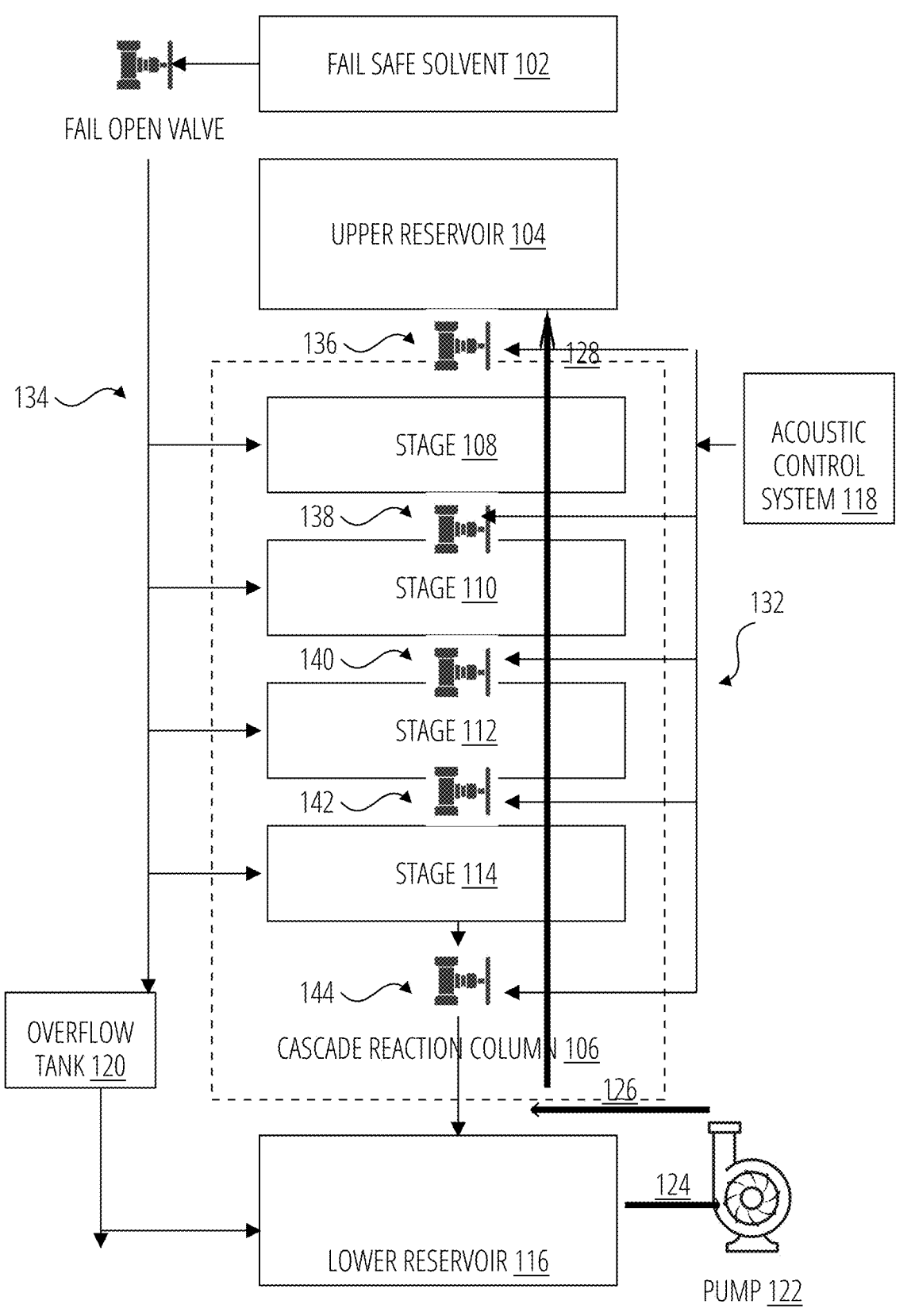
FIG. 1 is a schematic cross-sectional view of the complete gravitational cascade flow battery system with thixotropic flow control according to an embodiment of the present invention.

Referring to FIG. 1, the gravitational cascade flow battery system comprises a cascade reaction column 106 having a height H of 10-30 meters containing multiple electrochemical reaction stages arranged vertically shown as stage 108, stage 110, stage 112, stage 114, acoustic chokes 136-144 connecting the stages, an upper reservoir 104 containing thixotropic electrolyte slurry in a first state, a lower reservoir 116 containing slurry in a second state, a fail-safe solvent 102 reservoir at the column apex, and an acoustic control system 118 managing rheological states throughout, an overflow tank 120, a pump 122, fail safe solvent 102, a control circuit 132, and a solvent flow 134. The cascade reaction column 106 has an upper end to which is attached the upper reservoir and a lower end to which is attached the lower reservoir. The thixotropic electrolyte slurry exhibits gel behavior at rest and liquid behavior under acoustic stimulation. For convenience, only stages 108-114 and chokes 136-144 are shown, but it is understood that the system comprises 20-50 stages and chokes.

The electrolyte flow during charging and discharging is controlled exclusively through acoustically-induced viscosity modulation without mechanical pumps or valves. Cascade height H of 10-30 meters provides natural pressure head of 1-3 bar through hydrostatic pressure ($\rho gh$), sufficient to overcome flow resistance when the electrolyte is in its liquefied state. The optimal height of 15-20 meters balances pressure generation with structural considerations and fail-safe effectiveness.

Thixotropic Electrolyte Formulation

The positive electrolyte comprises cerium methanesulfonate with $Ce^{3+}/Ce^{4+}$ redox couple in 2-4 M methanesulfonic acid, modified with 0.5-2 wt % hydrophobic fumed silica (Aerosil R972) having a specific surface area of 110-130 $m^2/g$. The fumed silica forms a three-dimensional network through hydrogen bonding and van der Waals interactions, creating thixotropic behavior with yield stress $\tau_0$=50-200 Pa. The thixotropic electrolyte slurry comprises: electroactive species in solution and fumed silica rheology modifiers creating yield stress of 50-200 Pa.

At rest, the electrolyte exhibits gel-like behavior with apparent viscosity exceeding 1000 Pa·s, preventing any flow through the system. Under acoustic stimulation at 20-60 kHz generating shear rates above 100 $s^{-1}$, the silica network reversibly breaks down within 50-100 ms, reducing viscosity to liquid state 0.5-2 Pa·s, enabling controlled flow. said electrolyte slurry transitioning from gel state (>1000 Pa·s) to liquid state under acoustic activation. Recovery to gel state occurs within 1-2 seconds after acoustic cessation.

The negative electrolyte employs vanadium chloride with $V^{2+}/V^{3+}$ redox couple in 3-6 M HCl, similarly modified with acid-resistant fumed silica to achieve matching thixotropic properties. The rheology modifier maintains stability in the aggressive acid environment over 20,000+ cycles without degradation.

Cascade Reaction Column Architecture

Figure 2:
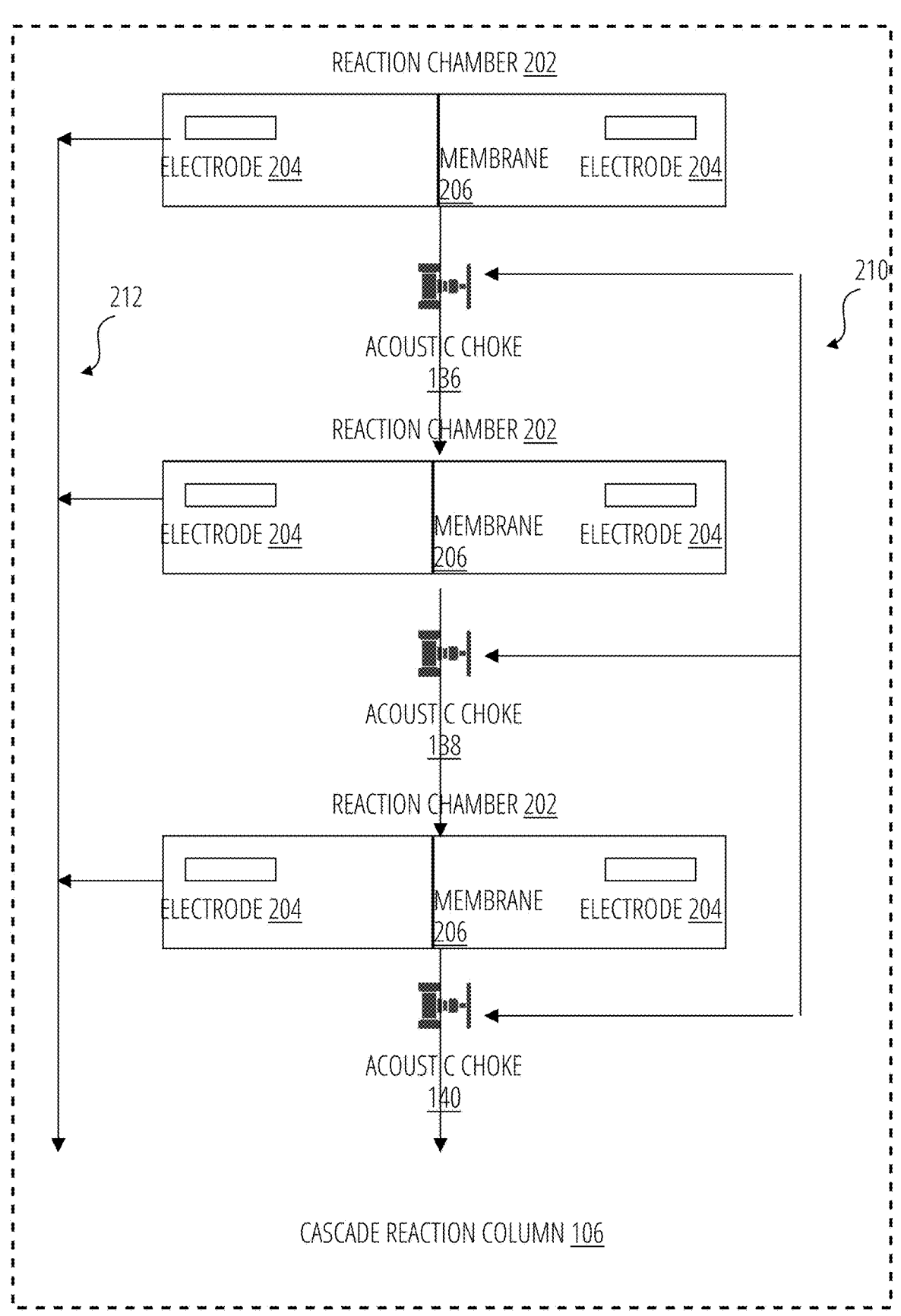
FIG. 2 illustrates the cascade reaction column showing multiple reaction stages with acoustic chokes and transducers for rheological control.

Referring to FIG. 2, the cascade reaction column 106, comprises 20-50 individual reaction stages (only stages 108-114 are shown) vertically arranged with 20-50 cm spacing. Each stage comprises a reaction chamber 202, two electrodes 204, a membrane 206, a control signal 210, and an overflow channel 212 for pressure equalization, with 5-10 cm depth. Acoustic chokes 136-140 control inter-stage flow. Control signals 210 control the acoustic chokes. Rheological state monitoring uses ultrasonic sensors. Although FIG. 2 only depicts three reaction stages, for convenience of illustration, it is understood that the system comprises 20-50 such stages.

In one embodiment, vertical tower height generates hydrostatic pressure of 1-3 bar sufficient to drive flow through activated acoustic chokes without mechanical pumping.

Figure 3:
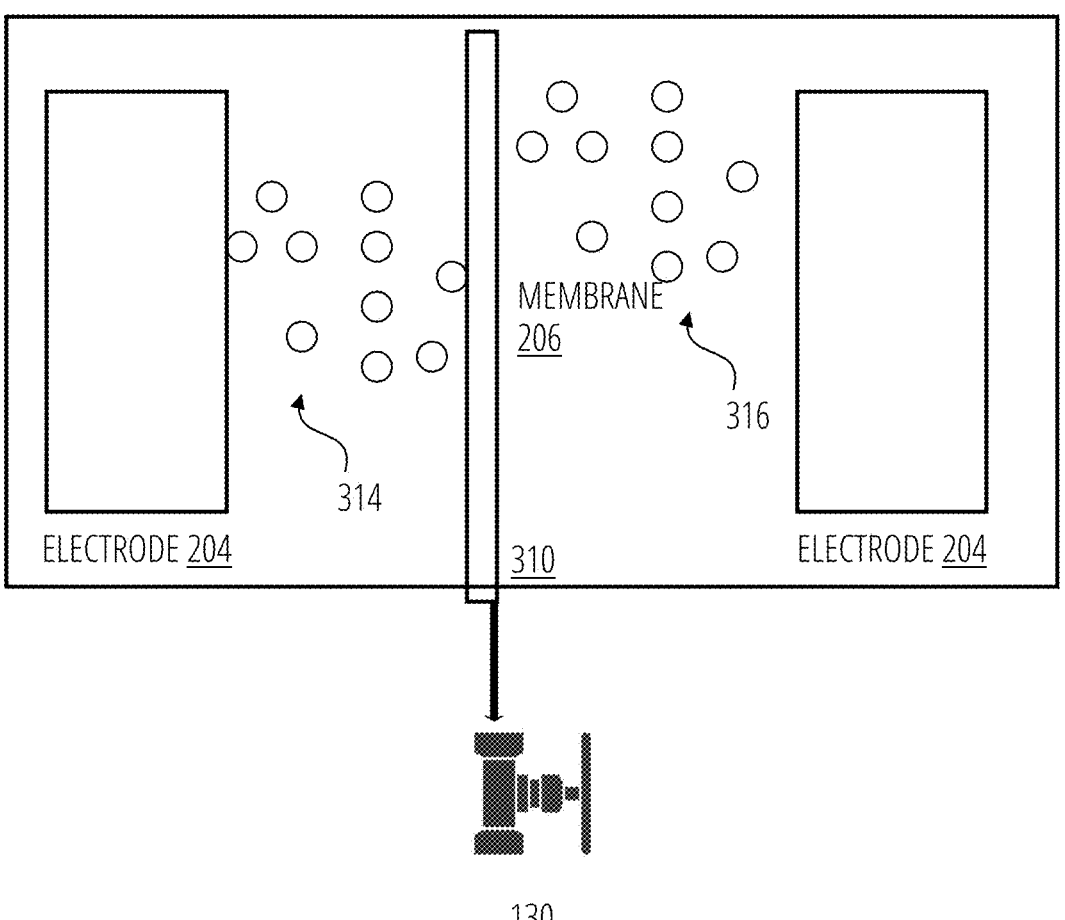
FIG. 3 shows a detailed view of a single reaction stage including electrode structure, membrane configuration, and acoustic choke geometry.

As shown in FIG. 3, each reaction chamber (reaction chamber 202 is shown as an example) incorporates carbon foam electrodes 204 with hierarchical porosity accommodating micro-sphere flow: macropores (500-1000 μm) serving as flow channels larger than maximum particle size, mesopores (10-50 μm) for electrolyte access between particles, and micropores (0.5-2 μm) providing electrochemical surface area of 500-1000 m²/g. The electrode material comprises reticulated vitreous carbon foam with 45 pores per inch (ppi), providing 92% porosity while maintaining electrical conductivity >100 S/cm. The open-cell structure prevents particle trapping while the smooth glassy carbon surface resists abrasion from flowing spheres. Each reaction chamber is connected to the next by a choke 130, and also comprises a membrane 206, and microspheres 314 and 316. The membrane 206 allows passage of electrons while repelling passage of protons.

Micro-Encapsulated Phase Change Materials

Figure 4:
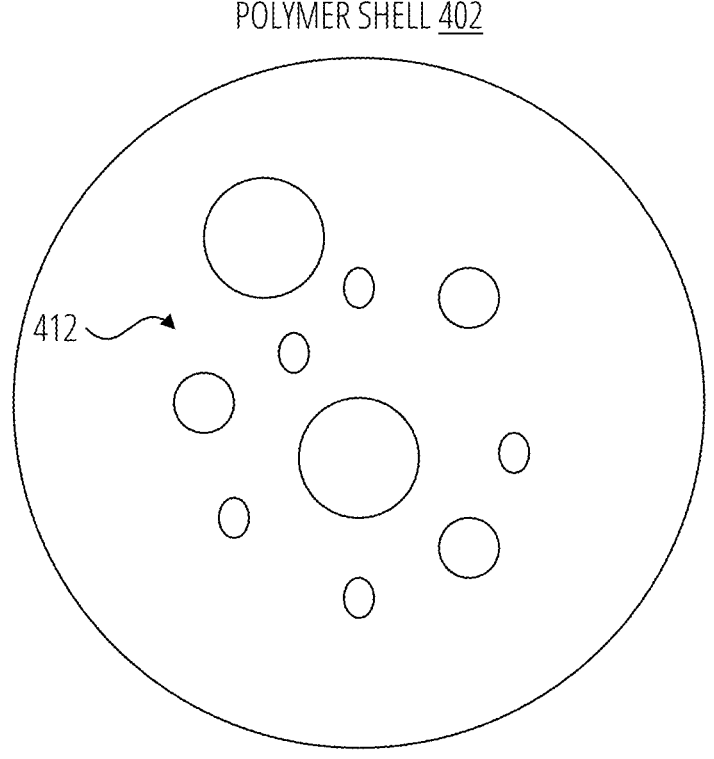
FIG. 4 depicts micro-encapsulated phase change particles showing smooth spherical morphology and internal crystallization.
Figure 4:
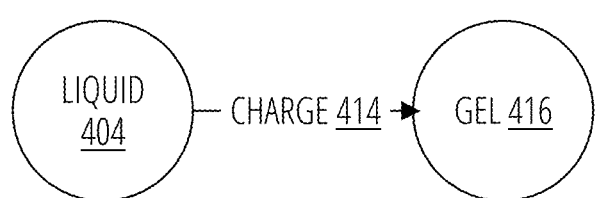

As illustrated in FIG. 4, the micro-encapsulated particles comprise permeable polymer shells 402 of cross-linked polyacrylamide containing electroactive species known as phase change particles 412. These particles enable energy storage by means of internal phase transitions. The shells have controlled porosity with 5-20 nm pores allowing ion transport while containing phase transitions. Shell thickness of 5-10 μm provides mechanical strength while minimizing transport resistance. Particle synthesis employs inverse suspension polymerization where aqueous droplets containing acrylamide monomer, cross-linker (N,N'-methylenebisacrylamide), and electroactive species are dispersed in a continuous oil phase. Polymerization initiated by ammonium persulfate creates shells around the active material. Particle size distribution of 50-500 μm (D50=200 μm) is controlled through agitation rate and surfactant concentration.

During charging, a charge 414 causes the liquid 404 particles in solution to super saturate and crystallize as a gel 416, Ce(SO₃CH₃)₄ or VCl₂·6H₂O, storing energy at high density while maintaining smooth spherical morphology. The external surface roughness Ra<1 μm prevents abrasion of soft components. Theory suggests that particles withstand 500 N/cm² compression without rupture.

The smooth spheres exhibit predictable flow behavior following Stokes law for settling velocity and Einstein's equation for viscosity contribution. This eliminates the chaotic behavior of irregular crystals that would cause channel blockage and membrane damage. Particle lifetime should exceed 20,000 cycles with <5% shell degradation.

Amphoteric Gradient Membrane Design

Figure 5:
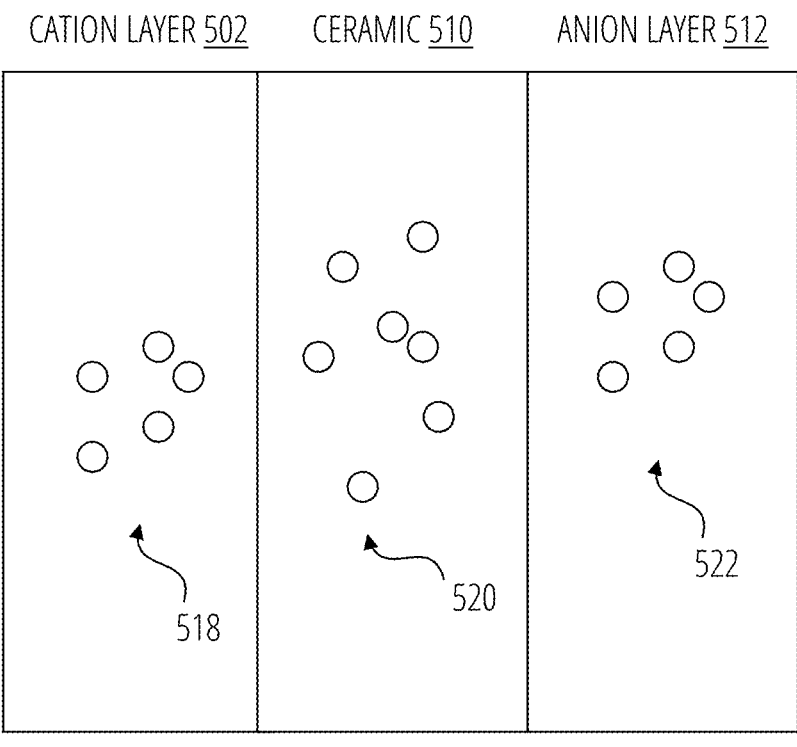
FIG. 5 is a detailed cross-section of the amphoteric gradient membrane structure with micro-sphere compatible pore sizing.

Referring to FIG. 5, the amphoteric gradient membrane 206 comprises three integrated layers optimized for micro-sphere compatibility: a cation-selective layer (cation layer 502) of sulfonated polyetheretherketone (SPEEK, 20 μm), containing cations 518, a ceramic support layer (ceramic 510) of porous alumina, 10 μm, containing pores 520 m and an anion-selective layer (anion layer 512) of quaternized polysulfone (20 μm), containing anions 522. The membrane pore structure is engineered to exclude micro-spheres while permitting unidirectional ion transport. Maximum pore diameter of 2 μm (10× smaller than minimum particle size) prevents particle crossover while maintaining ionic conductivity >10 mS/cm. The smooth membrane surface (Ra<0.5 μm) minimizes friction with flowing spheres.

pH-responsive behavior derives from the amphoteric character with isoelectric point at pH 2.5. This creates a chemical diode effect where ions preferentially transport in the thermodynamically favorable direction, reducing crossover contamination by >95% compared to conventional membranes.

Acoustic Choke Flow Control System

Figure 6:
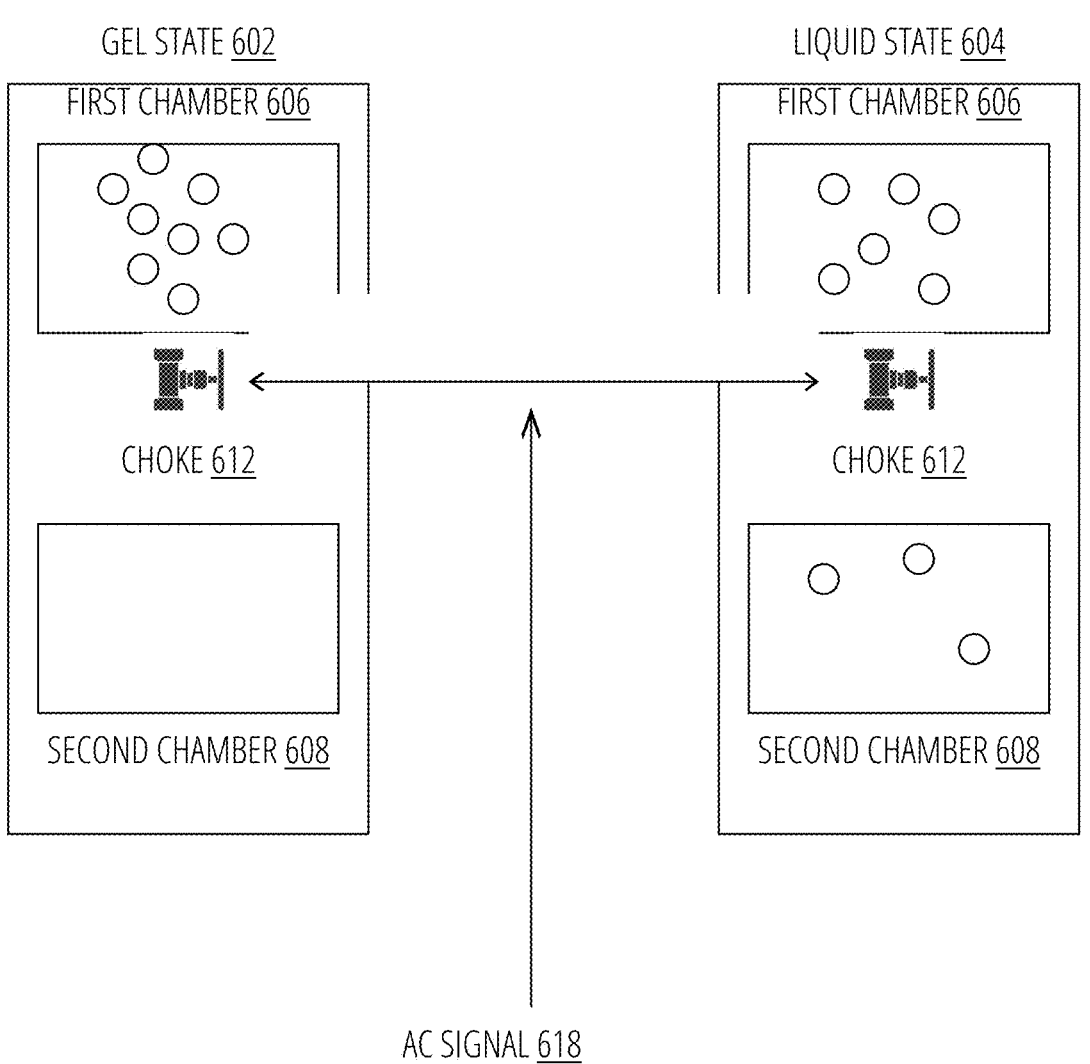
FIG. 6 illustrates the acoustic choke mechanism showing thixotropic gel in closed state and liquefied flow in open state.

As depicted in FIG. 6, chokes 612 replace mechanical valves through rheological control. The figure shows two adjacent chambers—a first chamber 606, and a second chamber 608 connected by a choke 612, but it is understood that the system comprises 20-50 chambers and chokes. The gel state 602 shows the condition when no AC signal 618 is applied to the choke 612. The liquid state 604 shows the condition when an AC signal 618 is applied to the choke.

Each choke comprises a simple cylindrical constriction of 2-5 mm diameter and 10-20 mm length connecting adjacent stages.

Each choke is actuated by an AC signal 618. Focused acoustic transducers positioned radially around each choke generate ultrasonic fields at 40 kHz with acoustic pressure amplitude of 10-50 kPa. The acoustic streaming velocity v=(αI)/(ρc) where a is absorption coefficient (0.1-0.2 Np/cm), I is intensity (10-100 W/cm²), ρ is density, and c is sound speed, creates localized shear rates exceeding 1000 s⁻¹.

In the absence of acoustic activation, a gel state 602 prevails. In that state, the thixotropic slurry's yield stress (50-200 Pa) exceeds the gravitational driving pressure (100-300 Pa/m height), preventing any flow.

When a signal is applied, the acoustic focal zone 303 extending 1-2 cm around the constriction causes the slurry liquefies to viscosity <1 Pas, a liquid state 604, enabling flow rates of 0.1-10 mL/s proportional to acoustic power. The relationship Q=K(P_acoustic) ˆ1.7 where K=0.15 mL/s/W ˆ1.7 provides precise flow control through digital power modulation.

The acoustic chokes provide response time <100 ms from closed to open state and automatic closure within 1-2 seconds upon acoustic cessation through thixotropic recovery.

The smooth bore eliminates clogging risk associated with complex valve geometries. Periodic high-intensity pulses (>100 W for 1 second) create cavitation that clears any accumulated material. Energy consumption of 1-5 W per choke during operation represents <0.5% parasitic loss compared to 2-5% for mechanical pumping.

Passive Solvent Flush Fail-Safe System

Figure 7:
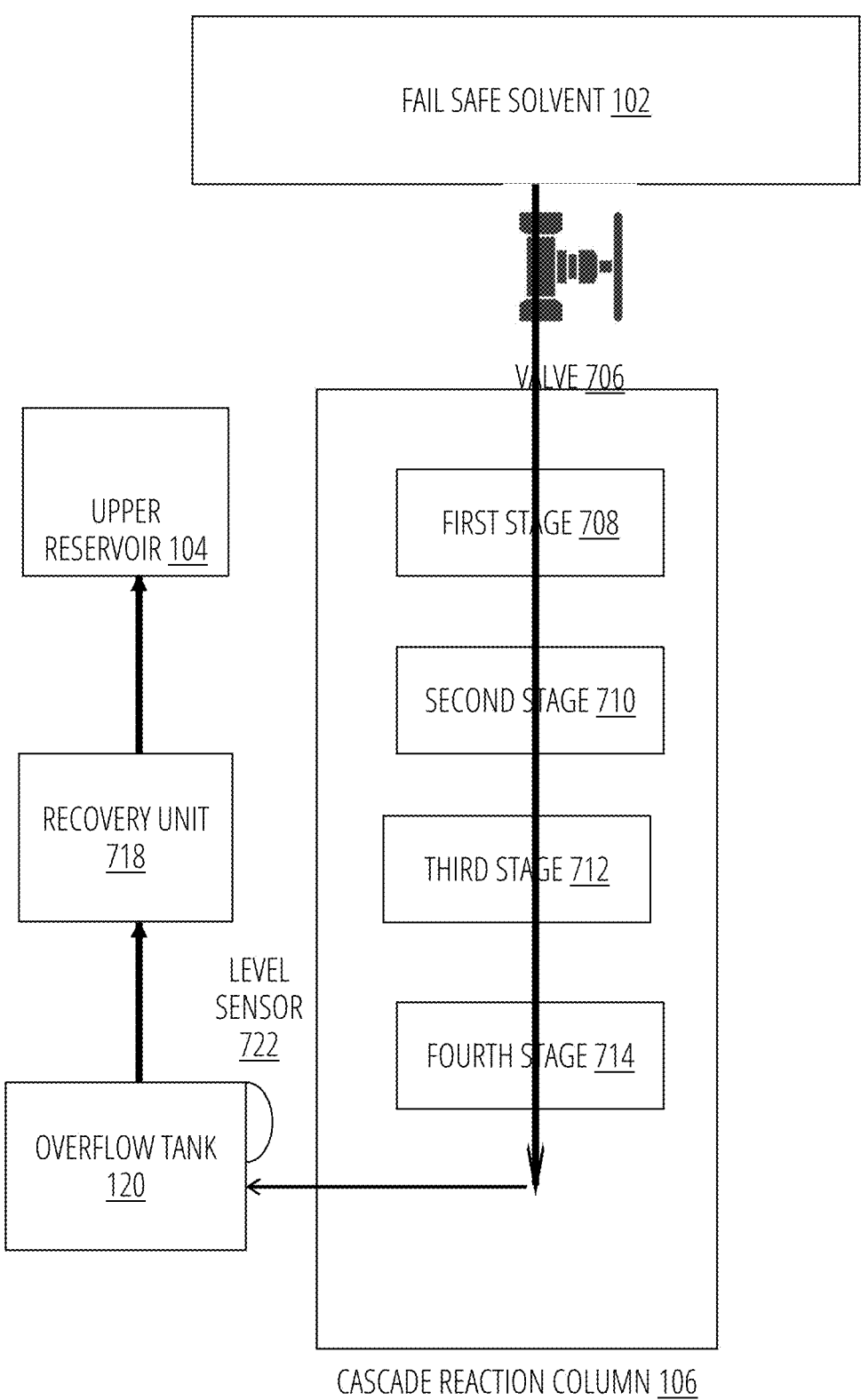
FIG. 7 shows the fail-safe solvent flush system with reservoir, fail-open valve, and overflow collection tank.

As illustrated in FIG. 7, the fail-safe system comprises a fail-safe solvent 102 contained in a reservoir, a cascade reaction column 106 comprising 20-50 stages (only stages 708-714 are shown), an overflow tank 120 connected to the last stage, a valve 706, and a recovery unit 718. When the valve 706 opens, solvent flows through a first stage 708, a second stage 710, a third stage 712, a fourth stage 714, and so on, through all the stages. The reservoir is positioned at the apex of the cascade reaction column 106. The positive and negative fluids flow down parallel channels within the cascade reaction column, separated by the membranes at each stage. The fail-safe solvent 102 contains 50-200 L of pure methanesulfonic acid (positive side) or hydrochloric acid (negative side) maintained at 40-60° C. by trace heating consuming 20-50 W. The elevated temperature ensures viscosity <5 mPa·s for rapid gravity flow.

A fail-open valve 706 employs a neodymium permanent magnet creating 50 N closing force opposed by an electromagnet consuming 5-10 W continuously. Upon power loss, spring force and gravity immediately open the valve within 100 ms, initiating solvent flow at 10-50 L/min depending on cascade reaction column 106 height.

The hot solvent dissolves any gelled or crystallized material through combined chemical dissolution and thermal liquefaction. Complete cascade flushing occurs within 2-5 minutes, with diluted electrolyte collecting in overflow tank 120 sized at 150% of flush volume. Level sensors 722 prevent overflow and trigger alarms.

System recovery involves: (1) pumping diluted electrolyte from the overflow tank 120 to the recovery unit 718, (2) vacuum evaporation or membrane separation restoring concentration, (3) rheology modifier addition and homogenization, (4) re-encapsulation of particles if needed, and (5) refilling of reservoirs 104. Total recovery time of 4-8 hours prevents permanent damage that would occur from solidification.

Gravity-Driven Circulation Dynamics

The hydrostatic pressure differential $\Delta P = \rho gh$ where density $\rho = 1400\text{-}1600$ kg/m$^3$ for the slurry provides 0.14-0.16 bar/m height. For a 20-meter vertical tower, total pressure of 2.8-3.2 bar drives flow when acoustic chokes are activated. The pressure exceeds the sum of membrane resistance (0.5-1 bar) and fluid friction losses (0.5-1 bar).

Natural convection from reaction heat (exothermic discharge generating 10-20 W/L) creates density variations $\Delta \rho = 20\text{-}50$ kg/m$^3$, establishing buoyancy-driven circulation supplementing gravitational flow. The Rayleigh number $Ra = g\beta \Delta TH^3/v\alpha > 10^8$ indicates turbulent convection enhancing mixing without requiring mechanical agitation.

Flow velocity through activated chokes of 0.5-5 cm/s provides residence time of 10-30 seconds per stage, optimizing reaction extent while preventing concentration polarization. The total cascade transit time of 5-15 minutes matches the discharge rate for grid-scale applications.

Control System Architecture

Figure 8:
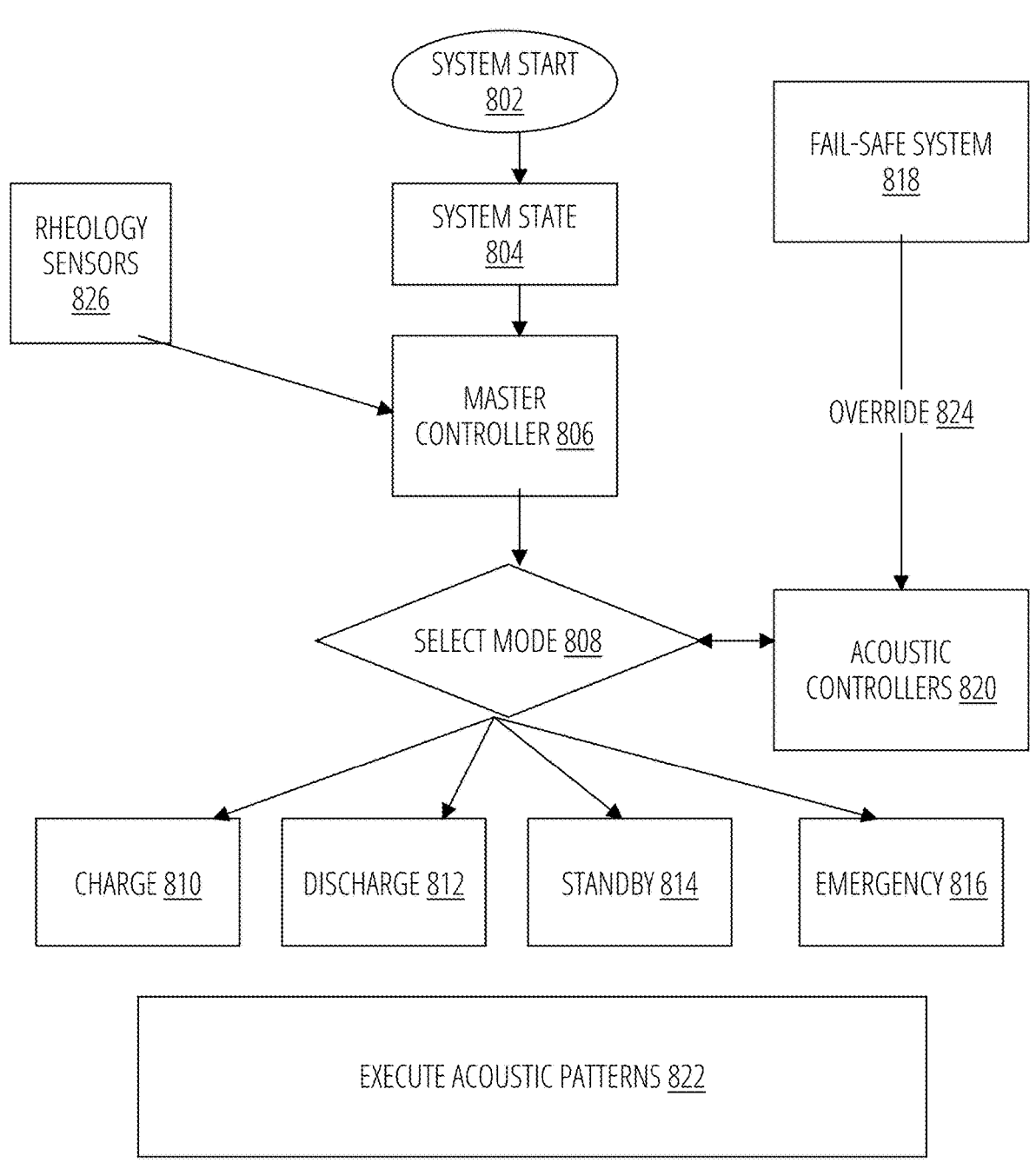
FIG. 8 is a flow chart of the control system logic managing rheological states, acoustic activation, and fail-safe triggers.

Referring to FIG. 8, the control system employs hierarchical architecture with a master controller 806 implementing machine learning algorithms, acoustic controllers 820 managing individual chokes, rheology sensors 826 monitoring gel/liquid transitions, and a fail-safe system 818, managing emergency responses. System start 802 is followed by determination of system state 804. Rheology sensors 826 feed data to the master controller 806, which selects mode 808: charge 810, discharge 812, standbys 814, or emergency 816. The selected mode executes acoustic patterns 822. When activated, the fail-safe system 818 sends an override 824 signal to the acoustic controllers 820.

The machine learning module uses recurrent neural networks (LSTM architecture with 256 hidden units) trained on 10,000+ hours of operational data to predict optimal acoustic patterns for varying conditions. Input parameters include temperature, concentration, flow rate history, and power demand. The model achieves 96% accuracy in predicting required acoustic power for target flow rates.

Rheological state monitoring employs embedded ultrasonic transducers operating at 1 MHz (distinct from 40 kHz flow control) measuring shear wave propagation velocity correlating with gel strength. Real-time viscosity inference enables closed-loop control maintaining optimal thixotropic state.

Once the electrolyte is fully charged, the system cannot absorb any more energy, and the Master Controller switches the system to Standby Mode. In this mode, the acoustic chokes are deactivated (turned off). Without the acoustic vibrations, the electrolyte instantly reverts from a liquid back into a solid gel. The system stops consuming the charging power and sits idle, consuming less than 0.01% of its energy per day to monitor system state.

The fail-safe controller operates independently on isolated power supply (24V battery with 72-hour capacity), monitoring grid connection, temperature, pressure, and flow parameters. Triggering conditions include: power loss >10 seconds, temperature excursion beyond 10-60° C., pressure spike >5 bar, or flow cessation >1 minute.

Operational Modes

The physical positioning of electrolyte is distinct from the electrochemical energy conversion processes. The system operates in a three-phase cycle: (1) a pumping phase where electrolyte is lifted from the lower reservoir 116 to the upper reservoir 104, (2) a gravity-flow phase where the positioned electrolyte cascades through the reaction stages, and (3) an electrochemical conversion phase that occurs simultaneously with the gravity flow.

A single low-power pump 122 (100 W) lifts liquid electrolyte through path 128 through the cascade reaction column 106 requiring only height elevation, not pressure generation. Upon reaching upper reservoir, acoustic deactivation returns slurry to gel state for storage. During the pumping phase, all acoustic chokes 136-144 are activated to maintain the slurry in a liquid state ($\eta < 2$ Pa·s), enabling the 100 W pump to lift the electrolyte at 10-30 kg/min over 1-3 hours. This pumping phase precedes each gravity-flow operation, whether the subsequent electrochemical process will be charging (energy storage) or discharging (energy release).

The electrochemical conversion-either charging or discharging-occurs exclusively during downward gravity flow through the cascade reaction stages, as acoustic chokes are activated sequentially to create localized liquefaction zones. The thixotropic electrolyte flows downward through cascaded electrochemical cells under gravity. The flow rate is controlled by acoustic power modulation.

During a charging operation, electrical energy is applied to the electrodes 204 as the electrolyte flows downward, driving the oxidation of $Ce^{3+}$ to $Ce^{4+}$ and reduction of $V^{3+}$ to $V^{2+}$, storing energy within the micro-encapsulated particles 316 through phase transitions. During a discharging operation, the same downward flow releases stored energy as the reactions reverse, generating electrical output. The critical innovation is that the modest pumping energy (100-300 Wh to lift 1 m$^3$) is amortized over the large energy throughput (200 kWh stored in 1 m$^3$), resulting in a pumping penalty of only 0.1-0.2% per cycle. The system may also operate in a "positioning-only" mode where electrolyte is pumped to the upper reservoir and held in gel state for hours or days before initiating gravity flow, enabling temporal decoupling between the positioning phase and the energy conversion phase to match grid demand patterns.

Controlled charging involves sequential stage activation where acoustic chokes open progressively from top to bottom, creating a controlled flow wave. Electrochemical reactions proceed as $Ce^{3+}$ oxidizes to $Ce^{4+}$ and $V^{3+}$ reduces to $V^{2+}$. Energy storage occurs through phase transitions within micro-spheres maintaining constant slurry rheology.

During a charging operation, the upper reservoir contains the electrolyte slurry in a discharged state, wherein the electroactive species located within the micro-encapsulated particles exist as a supersaturated liquid solution. As the slurry flows downward through the cascade reaction column, the application of electrical energy induces a phase transition, causing the liquid species to crystallize into solid material in a gel state (e.g., $Ce(SO_3CH_3)_4$ or $VCl_2 \cdot 6H_2O$) within the polymer shells. Consequently, as the process concludes, the lower reservoir collects the electrolyte in a fully charged state, characterized by a suspension of micro-spheres containing solid crystalline energy storage material.

Conversely, during a discharging operation—performed after the charged slurry has been mechanically positioned in the upper reservoir—the upper reservoir contains the electrolyte in its charged, crystallized state. Discharge mode initiates by activating top-stage acoustic chokes, liquefying slurry for gravity flow through the first reaction stage. Sequential downstream activation creates continuous controlled flow with 1.35V per stage and current density of 50-200 mA/cm². Power output modulation from 10% to 100% occurs through acoustic power adjustment controlling flow rate.

As this charged slurry flows downward through the reaction stages, the electrochemical reactions reverse, causing the solid gel-state crystals within the micro-spheres to dissolve back into a liquid phase. Upon reaching the bottom of the column, the lower reservoir collects the electrolyte in a discharged state, comprised of micro-spheres containing liquid electroactive solution, ready to be pumped to the upper reservoir for the next charging cycle.

The slurry electrolyte is a mixture of two distinct things:
(1) The liquid carrier is a liquid acid solution (Methane-sulfonic acid or HCl) that flows freely around the particles. This liquid contains dissolved ions that can move back and forth.
(2) The micro-spheres, which are tiny polymer balls floating in the liquid. The actual energy-storing material (Cerium or Vanadium) is trapped inside these spheres.

The ionization reaction happens through the shell of the sphere. The polymer shells of the spheres have tiny pores (5-20 nm). These pores are large enough for small ions (like protons) and electrons to pass through, but small enough to keep the large Cerium or Vanadium molecules trapped inside.

When the slurry flows past the carbon foam electrodes, the electrons travel from the electrode, through the liquid carrier, and interact with the surface of the spheres. To balance the electric charge, small ions (protons/H+) flow in or out of the sphere through the pores.

The actual chemical change occurs inside the micro-spheres. During charging, as current flows, the liquid solution trapped inside the sphere becomes "supersaturated." It can no longer stay liquid, so it precipitates (freezes) into a solid gel-state crystal. This locks the energy into a solid form. During discharging, current flows the other way, and the crystal dissolves back into a liquid solution inside the sphere, releasing the energy.

The electrical and physical composition of the electrodes does not change during the charging and discharging process. The electrodes are inert conductive scaffolds, made of reticulated vitreous carbon foam. Unlike lithium-ion batteries where the electrodes chemically change (absorbing ions like a sponge), these electrodes serve only as a surface where the reaction happens. They conduct electricity but do not participate in the chemical reaction themselves.

Standby mode maintains gel state throughout the system with periodic "heartbeat" pulses (100 ms pulse every 10 minutes) preventing long-term consolidation. Energy consumption <0.01% daily enables multi-month storage without degradation. Temperature control at 25±2° C. prevents unwanted phase transitions.

Emergency flush mode triggers automatically upon fail-safe activation or manually for maintenance. All acoustic chokes activate at maximum power while the solvent valve opens, creating dual liquid paths ensuring complete system clearing. Post-flush nitrogen purge removes residual acid preparing for maintenance or recovery.

Performance Characteristics

The system is predicted to achieve practical energy density of 200 Wh/L accounting for micro-encapsulation volume, rheology modifiers, and operational margins. This represents 8× improvement over conventional VRFBs (25 Wh/L) while maintaining feasible engineering parameters.

Round-trip efficiency of 80-82% comprises: electrochemical efficiency 88%, voltage efficiency 92%, acoustic control consumption 0.5%, and thermal losses 2%. The elimination of pumping power (typically 2-5%) partially offsets acoustic energy requirements.

Power density of 200-500 W/L depends on cascade stages, electrode area, and maximum flow rate. Response time from standby to full power of 2-5 seconds includes acoustic activation, flow establishment, and voltage stabilization. This meets grid regulation requirements while enabling passive standby.

Lifecycle simulation suggests capacity retention >95% after 20,000 cycles attributed to: micro-sphere protection preventing electrode abrasion, smooth flow eliminating mechanical wear, acoustic cleaning maintaining performance, and fail-safe prevention of catastrophic failures. Projected lifetime exceeds 30 years with annual solvent flush maintenance.

System Scalability and Modularity

Modular construction employs prefabricated vertical tower sections containing 5-10 reaction stages with integrated acoustic systems. Sections connect via flanged joints with conductive gaskets providing electrical continuity and double O-ring seals preventing leakage.

Capacity scaling from 100 kWh to 10 MWh utilizes parallel vertical towers sharing common fail-safe systems. Underground installation in mines or purpose-built shafts enables 100+ meter heights for utility-scale storage. Natural cooling in underground environments reduces thermal management requirements.

Manufacturing employs injection-molded polymer components for reaction chambers, commercially available ultrasonic transducers, and standard industrial vertical tower construction. Acoustic chokes require only precision boring without complex geometries. Total system cost projects to $150-200/kWh at scale, competitive with lithium-ion for long-duration storage.

I claim:
1. A gravitational flow battery system comprising:
a cascade reaction column having a height of at least 10 meters, said cascade reaction column having an upper end and a lower end;
an upper reservoir positioned at the upper end of said cascade reaction column; and
a lower reservoir positioned at the lower end of said cascade reaction column;
said cascade reaction column comprising:
a plurality of electrochemical reaction stages arranged vertically within said cascade reaction column;
a thixotropic electrolyte slurry exhibiting gel behavior at rest and liquid behavior under acoustic stimulation contained within said cascade reaction column;
acoustic chokes positioned between the stages, each acoustic choke comprising a constriction where focused acoustic fields control flow through rheological state changes;

wherein flow of the thixotropic electrolyte slurry is controlled exclusively through acoustically-induced viscosity modulation without mechanical pumps or valves; and wherein the thixotropic electrolyte slurry comprises a positive electrolyte containing a cerium redox couple in which $Ce^{3+}$ is oxidized to $Ce^{4+}$ during charging, and a negative electrolyte containing a vanadium redox couple in which $V^{3+}$ is reduced to $V^{2+}$ during charging, said positive and negative electrolytes being separated by a membrane permitting ion transport while preventing electrolyte mixing, whereby the complementary oxidation and reduction half-reactions generate a cell voltage of approximately 1.35 volts per reaction stage;

wherein said thixotropic electrolyte slurry comprises:

electroactive species in a solution;

fumed silica rheology modifiers;

said thixotropic electrolyte slurry transitioning from gel state exhibiting apparent viscosity greater than 1000 Pa·s to liquid state exhibiting apparent viscosity less than 2 Pa·s under acoustic activation.

2. The system of claim 1, further comprising micro-encapsulated phase change particles wherein:

electroactive species are contained within permeable polymer spheres of 50-500 μm diameter;

said spheres comprise cross-linked polyacrylamide shells with 5-20 nm pore size;

crystallization of the electroactive species occurs within said spheres during charging while maintaining smooth external morphology with surface roughness Ra less than 1 μm.

3. The system of claim 1, wherein said acoustic chokes comprise:

cylindrical constrictions of 2-5 mm diameter;

radially positioned ultrasonic transducers generating focused fields at 40 kHz;

localized liquefaction zones extending 1-2 cm where shear rate exceeds $1000\ s^{-1}$;

flow rate of the flow of the thixotropic electrolyte slurry proportional to acoustic power following $Q=K(P\_acoustic)^{1.7}$, where Q is the flow rate in mL/s, $K=0.15\ mL/(s\cdot W^{1.7})$, and P_acoustic is acoustic power generated by the ultrasonic transducer with the unit of W.

4. The system of claim 1 wherein the cascade reaction column generates hydrostatic pressure of 1-3 bar through said height of at least 10 meters sufficient to drive flow of the thixotropic electrolyte slurry through the activated acoustic chokes without mechanical pumping.

5. The system of claim 1; further comprising a control system with:

machine learning algorithms predicting optimal acoustic patterns;

rheological state monitoring using ultrasonic sensors; and sequential stage activation creating controlled flow waves.

6. The system of claim 2, wherein said micro-encapsulated phase change particles achieve energy storage density of at least 200 Wh/L through internal phase transitions and wherein said particles exhibit surface roughness Ra less than 1 μm.

7. The system of claim 2 wherein each of the electrochemical reaction stages comprises:

reticulated vitreous carbon foam electrodes with 45 pores per inch and 92% porosity;

an amphoteric gradient membrane excluding the micro-encapsulated phase change particles while permitting ion transport; and a hierarchical pore structure of the reticulated vitreous carbon foam electrodes with macropores larger than a maximum size of the micro-encapsulated phase change particles;

wherein the particles are the microencapsulated phase change particle recited in claim 2.

8. The system of claim 7 wherein said amphoteric gradient membrane comprises:

a cation-selective sulfonated polyetheretherketone (SPEEK) layer;

an anion-selective quaternized polysulfone layer;

maximum pore diameter of 2 μm preventing crossover of the micro-encapsulated phase change particles;

pH-responsive behavior creating unidirectional ion transport;

wherein the particles are the microencapsulated phase change particle recited in claim 2.

9. A gravitational flow battery system comprising:

a cascade reaction column having a height of at least 10 meters, said cascade reaction column having an upper end and a lower end;

an upper reservoir positioned at the upper end of said cascade reaction column and a lower reservoir positioned at the lower end of said cascade reaction column;

a plurality of electrochemical reaction stages arranged vertically within said cascade reaction column;

a thixotropic electrolyte slurry exhibiting gel behavior at rest and liquid behavior under acoustic stimulation contained within said cascade reaction column;

acoustic chokes positioned between the stages, each acoustic choke comprising a constriction where focused acoustic fields control flow through rheological state changes;

wherein flow of the thixotropic electrolyte slurry is controlled exclusively through acoustically-induced viscosity modulation without mechanical pumps or valves;

further comprising a passive fail-safe system including:

a solvent reservoir positioned above said cascade reaction column containing pure acid at 40-60° C.; and a fail-open magnetic valve held closed by continuous electromagnetic force;

wherein upon power loss, gravity-driven solvent flush dissolves solidified material within 2-5 minutes.

10. A gravitational flow battery system comprising:

a cascade reaction column having a height of at least 10 meters, said cascade reaction column having an upper end and a lower end;

an upper reservoir positioned at the upper end of said cascade reaction column and a lower reservoir positioned at the lower end of said cascade reaction column;

a plurality of electrochemical reaction stages arranged vertically within said cascade reaction column;

a thixotropic electrolyte slurry exhibiting gel behavior at rest and liquid behavior under acoustic stimulation contained within said cascade reaction column;

acoustic chokes positioned between the stages, each acoustic choke comprising a constriction where focused acoustic fields control flow through rheological state changes;

wherein flow of the thixotropic electrolyte slurry is controlled exclusively through acoustically-induced viscosity modulation without mechanical pumps or valves;

wherein said acoustic chokes comprise:

cylindrical constrictions of 2-5 mm diameter;

radially positioned ultrasonic transducers generating focused fields at 40 kHz;

localized liquefaction zones extending 1-2 cm where shear rate exceeds 1000 s$^{-1}$;

flow rate of the flow of the thixotropic electrolyte slurry proportional to acoustic power following Q=K(P_acoustic) ^1.7;

where Q is the flow rate in mL/s, K=0.15 mL/(s·W^1.7), and P_acoustic is acoustic power generated by the ultrasonic transducer with the unit of W; and wherein said acoustic chokes provide response time <100 ms from closed to open state and automatic closure within 1-2 seconds upon acoustic cessation through thixotropic recovery.

* * * * *